United States Patent
Nakano et al.

(10) Patent No.: US 6,535,332 B1
(45) Date of Patent: Mar. 18, 2003

(54) INFRARED OPTICAL SYSTEM FOR INFRARED CAMERAS

(75) Inventors: Takayuki Nakano, Tokyo (JP); Yasuhisa Tamagawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/703,642

(22) Filed: Nov. 2, 2000

Related U.S. Application Data

(63) Continuation of application No. PCT/JP00/00045, filed on Jan. 7, 2000.

(30) Foreign Application Priority Data

Mar. 3, 1999 (JP) ............................................. 11-055333

(51) Int. Cl.⁷ ................................................ G02B 13/14
(52) U.S. Cl. ...................... 359/356; 359/355; 359/728; 359/739
(58) Field of Search ................................ 359/355, 356, 359/357, 698, 728, 739, 798

(56) References Cited

U.S. PATENT DOCUMENTS

| 3,551,051 A | * 12/1970 | Salgo ........................ 359/356 |
| 4,443,067 A |   4/1984  | Owen, Jr. et al. ............ 359/716 |
| 4,507,551 A | * 3/1985  | Howard et al. .............. 359/708 |
| 4,921,318 A | * 5/1990  | Szumski ..................... 359/356 |
| 5,000,552 A |   3/1991  | Simpson, Jr. et al. ........ 359/740 |
| 5,327,291 A |   7/1994  | Baker et al. ................ 359/716 |
| 5,995,280 A | * 11/1999 | Beach ........................ 359/366 |

FOREIGN PATENT DOCUMENTS

| JP | A4230717 | 8/1992 |
| JP | A 560600 | 3/1993 |
| JP | A 784185 | 3/1995 |
| JP | A7113952 | 5/1995 |

* cited by examiner

*Primary Examiner*—Cassandra Spyrou
*Assistant Examiner*—Arnel C. Lavarias
(74) *Attorney, Agent, or Firm*—Birch, Stewart, Kolasch & Birch, LLP

(57) ABSTRACT

An infrared optical system for infrared cameras has a convex lens held by a holding member composed of a low-dispersion material that transmits infrared light. A stop for restricting light beams entering the convex lens is disposed on an object side from the convex lens. An aberration correcting plate for reducing spherical aberration is provided in the vicinity of the stop. A field flattener, the thickness of which changes along image height to offset curvature of field, is disposed on an image side of the convex lens.

11 Claims, 6 Drawing Sheets

INFRARED OPTICAL SYSTEM FOR INFRARED CAMERAS

CROSS REFERENCE TO RELATED APPLICATION

This is a continuation of International Application PCT/JP00/00045, with an international filing date of Jan. 7, 2000, the contents of which is hereby incorporated by reference into the present application.

BACKGROUND OF THE INVENTION

1. Field of the Invention

The present invention relates to an infrared optical system, used for infrared cameras, for forming images of an object.

2. Description of the Related Art

Generally, infrared optical systems used in infrared cameras require the ability to form an image of an object on a detector. However, if the aberration of the infrared optical system is large, the object image formed by the camera becomes blurred, resulting in great decline in image quality. Therefore, infrared optical systems for the infrared cameras must have little aberration.

One method of realizing an infrared optical system exhibiting small aberration is to increase the number of lens elements as components. That is, the degree of freedom in terms of lens surface, lens thickness, lens-to-lens spacing, etc. is raised by increasing the number of lenses, to thereby enhance the aberration correcting capability of the infrared optical system. However, by increasing the number of lenses, the costs for the infrared optical system such as for lens material, fabrication and assembly also increase. Further, in addition to the rise in costs, there are also such problems as increased weight, expanded dimensions and more complicated adjustment of the assembly. It is therefore desirable in this respect to reduce the number of lenses.

FIG. 14 is a sectional view of a prior art infrared optical system shown in, e.g., [Design Example for the Use of Hybrid Optical Elements in the Infrared] by Max reported on pp.6833–6834, [Applied Optics Magazine] issued on Dec. 1, 1996.

This infrared optical system is used in an infrared-ray region having a wavelength band of 8–12 μm, wherein extremely small aberration is attained by two pieces of germanium lens elements. In the following discussion, the object side (left side in the drawings) is referred to as the front surface of the lens, while the image side (right side in the drawings) is called the rear surface of the lens.

Referring to FIG. 14, a holding member 1 holds an aspherical diffraction lens 2 and a spherical lens 3 spaced away from each other. The aspherical diffraction lens 2 has a front surface 2a with a spherical shape and a rear surface 2b having a special configuration with a diffraction surface provided on an aspherical surface. The spherical lens 3 disposed on the image side from the aspherical diffraction lens 2 has a front surface 3a and a rear surface 3b, both of which are formed in a spherical shape. An object image obtained through the aspherical diffraction lens 2 and the spherical lens 3, is converted into electric signals by a detector 4 disposed facing the rear surface 3b of the spherical lens 3. The electric signals output from the detector 4 are converted into image signals by a signal processor (unillustrated), and the image signals are displayed as an infrared-ray image on a display unit (not shown).

In the thus constructed infrared optical system, the degree of freedom of the system is enhanced not by increasing the number of lens elements but by two kinds of effects imparted by the aspherical surface and the diffraction surface of the rear surface 2b of the aspherical diffraction lens 2 used therein. This degree of freedom is utilized to correct aberrations in the infrared optical system, and aberrations in the infrared optical system is thereby decreased. This reduces decline in image quality.

The infrared optical system described above involves the use of the diffraction surface for correcting the aberration. This diffraction surface, however, functions to deflect to optical path by utilizing the wave nature of light. That is, waves always propagate forward in a direction of wave surface alignment, and hence wave propagation direction is controlled by controlling the wave surface. In this case, as a matter of course, it is required that the wave surface be controlled at an accuracy smaller than the wavelength. Therefore, formation of the diffraction surface entails surface working having an accuracy smaller than the wavelength of the light. In the infrared optical system used for cameras for imaging the infrared ray having a wavelength on the order of, e.g., 10 μm, hyper fine surface working having an accuracy smaller than at least 10 μm is needed. Thus, a high-level working technique is necessary for forming the diffraction surface, and therefore costs rise and mass-production is hard to attain.

SUMMARY OF THE INVENTION

It is a primary object of the present invention, which was devised to obviate the above problems, to provide an infrared optical system for infrared cameras that is capable of reducing aberration without increasing the number of lens elements and without using hyperfine working.

To accomplish the above object, according to one aspect of the present invention, an infrared optical system for infrared cameras comprises a holding member, a convex lens held by the holding member and composed of a low-dispersion material transmitting infrared light, a stop, provided on an object-side on the basis of the convex lens, for restricting light beams entering the convex lens, and an aberration correcting plate, disposed in the vicinity of the stop and composed of a material transmitting the infrared light, for reducing spherical aberrations.

DETAILED DESCRIPTION OF THE PREFERRED EMBODIMENTS

Preferred embodiments of the present invention will hereinafter be described with reference to the accompanying drawings.

First Embodiment

Figure 1:
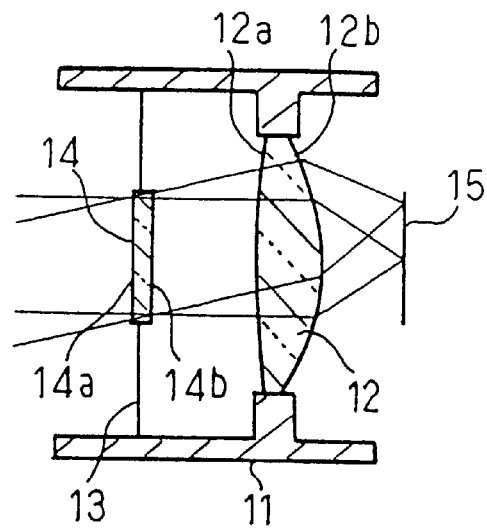
FIG. 1 is a sectional view showing an infrared optical system for infrared cameras in a first embodiment of the present invention.

FIG. 1 is a sectional view showing an infrared optical system for infrared cameras in a first embodiment of the present invention, wherein the wavelength of an infrared ray is set to 8–12 μm (enough not to be absorbed by the atmosphere) corresponding to the [atmospheric window]. Referring to FIG. 1, a cylindrical holding member 11 holds a convex lens 12 composed of germanium (Ge). The convex lens 12 has a spherical front surface 12a and a spherical rear surface 12b, or alternatively one single surface is spherical, while the other single surface is planar.

A stop 13 for restricting beams of light entering the convex lens 12 is held closer (more leftwards) to an object than the convex lens 12. An aberration correcting plate 14, composed of germanium, for reducing image aberration attributed to the object, is held in the vicinity of the stop 13 in the holding member 11. The aberration correcting plate 14 has a plane surface 14a. Further, the aberration correcting plate 14 has an aspherical rear surface 14b of which convexity and concavity are small so that thickness therefore can be decreased. A detector 15 for converting the object image obtained through the convex lens 12 into electric signals is disposed facing the rear surface 12b of the convex lens 12.

In the infrared optical system having the optical geometry described above, principal aberrations which deteriorate image quality are chromatic aberrations, spherical aberrations, comas, astigmatisms and field curvatures. Chromatic aberration is determined by dispersion characteristics of a lens material and refracting power of the lens. Refracting power of the infrared optical system is determined by the convex lens 12, and hence chromatic aberration is also determined by the convex lens 12.

In response to this, germanium, of which the convex lens 12 and the aberration correcting plate 14 are composed, exhibits high transmissivity with respect to infrared light in the above wavelength band, and hence there is little absorption of the infrared light by the convex lens 12, to thereby obtain a bright image. Further, germanium displays little dispersion (change in refractive index for the wavelength) with respect to infrared light in the wavelength band described above. Accordingly, chromatic aberration occurring in the convex lens 12 is small, and chromatic aberration in the whole infrared optical system is also small, with the result that deterioration of image quality due to chromatic aberration may be ignored.

Moreover, the stop 13 is disposed in a position so that the light beam traveling through the center of the stop 13 exits substantially vertical to the rear surface 12b of the convex lens 12, in the vicinity of the object-side focal length of the convex lens 12, whereby coma and astigmatism can be reduced. The curvature of field is categorized as an aberration proportional to the square of image height (displacement from the optical axis). The geometry described above is incapable of eliminating the curvature of field, however, if the image height is small, the curvature of field can be made small enough to be ignored.

Still further, large spherical aberration occurs in infrared optical systems constructed of only the convex lens 12 and the stop 13, and the image quality of the object may conspicuously decline. As a countermeasure, the aberration correcting plate 14 disposed in the vicinity of the stop 13 is so designed as to eliminate spherical aberration. To be more specific, as shown in FIG. 1, the infrared optical system is constructed of the convex lens 12, the stop 13 with the aberration correcting plate 14 added, whereby the aberration correcting plate 14 functions to mainly reduce the spherical aberration so that an object image with smaller aberration is obtained. Thus, the geometry in the first embodiment is capable of reducing the aberration without increasing the number of lens elements and without making use of hyperfine working.

Although germanium has been exemplified as the material of the convex lens 12 and of the aberration correcting plate 14 in the first embodiment, other materials are usable if they have high infrared transmissivity but little dispersion. For example, silicon (Si) meets this condition, and therefore an infrared optical system with little aberration can be obtained by using silicon for at least one of the convex lens 12 and the aberration correcting plate 14.

Further, the convex lens 12 and the aberration correcting plate 14 can be manufactured by polishing grinding by using a precision lathe or by molding. In the case of using germanium or silicon as a material, the above elements can also be manufactured by using semiconductor manufacturing technology such as a photo etching and holographic methods.

Moreover, material exhibiting high infrared transmissivity and small dispersion is selected as the material for the aberration correcting plate 14 in the first embodiment. However, as the aberration correcting plate 14 is aimed at correcting spherical aberration, it exhibits small refractive action to refract the light, so chromatic aberration occurring in the aberration correcting plate 14 is small even with material showing comparatively large dispersion. Accordingly, as long as the material of the aberration correcting plate 14, is transparent to infrared light, the dispersion need not be sufficiently small.

For instance, materials such as zinc sulfide (ZnS), zinc selenide (ZnSe) and gallium arsenide (GaAs) exhibit a large dispersion and transmit infrared, and can therefore be used for the aberration correcting plate 14. Further, plastic material also transmits infrared and can be therefore used for the aberration correcting plate 14.

Second Embodiment

Figure 2:
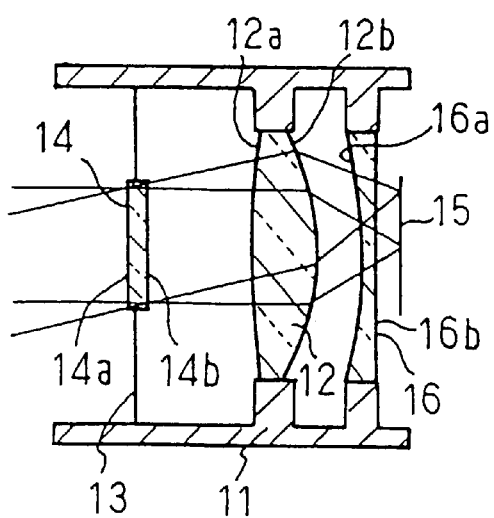
FIG. 2 is a sectional view showing the infrared optical system of the infrared camera in a second embodiment of the present invention.

FIG. 2 is a sectional view showing the infrared optical system of the infrared camera in a second embodiment of the present invention. Referring to FIG. 2, a field flattener 16 composed of germanium is held by the holding member 11 on an image side of the convex lens 12. This field flattener 16 incorporates a function to offset any curvature of field residual on the image. Other configurations are the same as those in the first embodiment.

Then, the curvature of field is not removed in the infrared optical system in the first embodiment. This is not conceived as a problem in the case of using a small-sized detector 15, but turns out to be the problem if a large-sized detector is used because of the large difference in image quality between the central area of the picture and the peripheral area thereof. By contrast, the second embodiment involves the use of the field flattener 16, thereby correcting the curvature of field and consequently obtaining an image with less aberrations in a wider visual field.

More specifically, the curvature of field is proportional to the square of image height, and, if the curvature of field is residual, the image surface is formed in a spherical shape. Namely, as the image height becomes larger with respect to an on-optical-axis position of the image surface, the image surface is bent more toward the object. Accordingly, when constructed in such a curved shape that a thickness of the field flattener 16 is set larger as the image height becomes larger, the bent image surface can be flattened.

Figure 6:
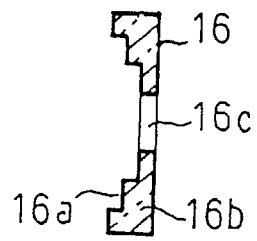
FIG. 6 is a sectional view showing a modified example of the field flattener in FIG. 5.

A front surface 16a of the field flattener 16 in FIG. 6 is formed in a concave shape, and a rear surface 16b thereof is formed in a plane, thus changing the thickness according to the image height. The image surface is thereby flattened, and, even when using the large detector 15, it is feasible to acquire the infrared optical system with the small aberration and the infrared-ray image with high quality as well. That is, the aberrations can be reduced without increasing the number of lens elements on the need to use hyperfine working.

Note that the front surface 16a of the field flattener 16 is formed in a curved shape in the first embodiment. However, the rear surface 16b may also be curved, or both the front surface 16a and the rear surface 16b may be formed in a curved shape.

Further, the field flattener 16 does not require sufficiently small dispersion if it is transparent to infrared, just as in the case of the aberration correcting plate 14. The field flattener 16 may be composed of, a compound such as, e.g., silicon, zinc sulfide, zinc selenide or gallium arsenide, or plastic material.

Moreover, the field flattener 16 can be, as in the case of the aberration correcting plate 14, manufactured by working methods such as polishing, grinding, molding and photo etching or holographic methods.

Third Embodiment

Figure 3:
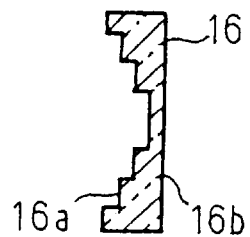
FIG. 3 is a sectional view showing a field flattener in a third embodiment of the present invention.
Figure 4:
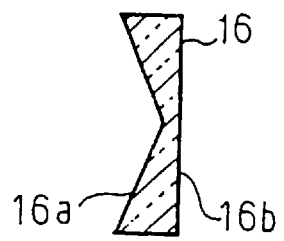
FIG. 4 is a sectional view showing a modified example of the field flattener in FIG. 3.

The second embodiment exemplified the field flattener 16 having a curved surface that offsets the curvature of field. If capable of sufficiently correcting the aberration caused by the curvature of field, the thickness of the field flattener 16 may be changed not curvilinearly but in a linearly approximate manner. This may be exemplified by, e.g., the thickness being changed stepwise as shown in FIG. 3, and the thickness being changed in a triangular shape as shown in FIG. 4. With these configurations, the working can be easily performed in the manufacturing process. As a matter of course, the stepwise change or the triangular change may be imparted to the rear surface 16b or both the front and rear surfaces. Further, lengths of all line segments forming the stepwise configuration in FIG. 3 do not have to be the same, and the angles of all the step edges may be arbitrary.

Fourth Embodiment

Figure 5:
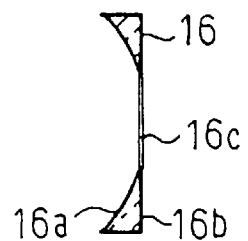
FIG. 5 is a sectional view showing the field flattener in a fourth embodiment of the present invention.
Figure 7:
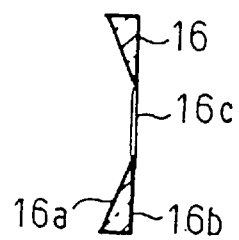
FIG. 7 is a sectional view showing another modified example of the field flattener in FIG. 5.

The field flattener 16 may have such a configuration that, for instance, a hole 16c is, as shown in FIGS. 5–7, formed in the central portion. FIG. 5 shows a configuration in which the field flattener 16 taking the shape in FIG. 2 is formed with the hole 16c. FIG. 6 illustrates a configuration wherein the field flattener 16 taking the shape in FIG. 3 is formed with the hole 16c. FIG. 7 shows a configuration in which the field flattener 16 taking the shape in FIG. 4 is formed with the hole 16c. As a matter of fact, changes in the configurations in FIGS. 5–7 may be given to the rear surface 16b or both surfaces. Further, a field flattener 16 assuming other configurations may also have the hole 16c formed in the central portion thereof.

The curvature of field due to the field flattener 16 is corrected so as to be, based on the image position at the central portion, aligned with the central portion with respect to its peripheral edge. Accordingly, it follows that the field flattener 16 has almost no correction effect at the central portion, and the central portion can be formed with the hole 16c. Further, the hole 16c is formed at the central portion of the field flattener 16, thereby making it feasible to reduce deterioration of the image quality without being influenced by dispersion for the wavelength and absorption of the infrared light due to the field flattener 16 at that portion.

Fifth Embodiment

Figure 8:
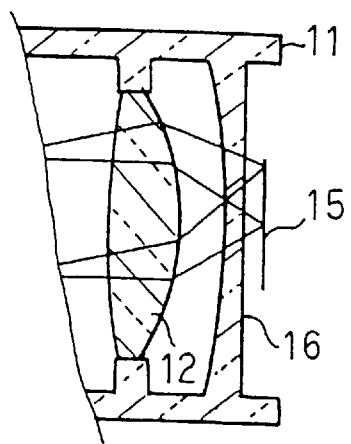
FIG. 8 is a sectional view showing principal elements of the infrared optical system in a fifth embodiment of the present invention.

FIG. 8 is a sectional view showing principal elements of the infrared optical system in a fifth embodiment of the present invention. In the fifth embodiment, both the holding member 11 and the field flattener 16 are composed of plastic material transparent to infrared light, and integrally molded. The other configurations are the same as those in the second embodiment.

This geometry, in which the holding member 11 and the field flattener 16 are formed into a unit body, is capable of reducing both the number of parts and the manufacturing and assemble steps. Moreover, since integral parts have no tolerance occurred when assembled, the assembly of the entire infrared optical system is facilitated.

Sixth Embodiment

Figure 9:
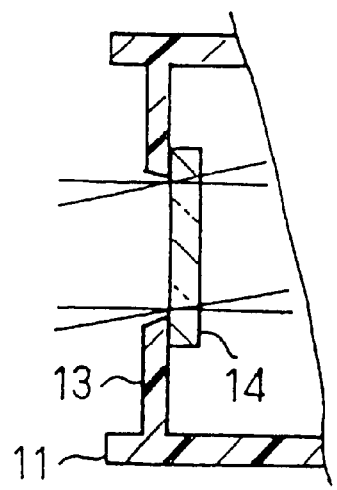
FIG. 9 is a sectional view showing principal elements of the infrared optical system in a sixth embodiment of the present invention.

FIG. 9 is a sectional view showing principal elements of the infrared optical system in a sixth embodiment of the present invention. In the sixth embodiment, both the holding member 11 and the stop 13 are composed of plastic material and integrally molded. Other configurations are the same as those in the first and second embodiments.

This geometry, in which the holding member 11 and the stop 13 are formed into a unit body, is capable of reducing both the number of parts and the manufacturing and assemble steps. Moreover, since the integral parts have no tolerance occurred when assembled, the assembly of the entire infrared optical system is facilitated.

Seventh Embodiment

Figure 10:
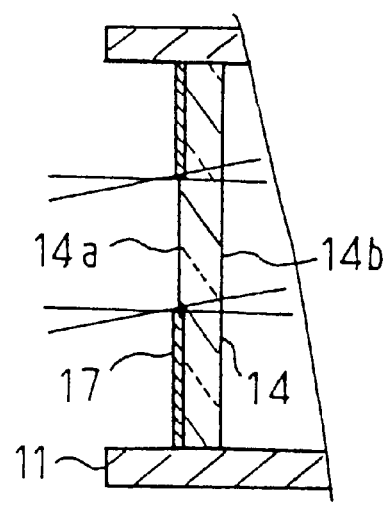
FIG. 10 is a sectional view showing principal elements of the infrared optical system in a seventh embodiment of the present invention.

FIG. 10 is a sectional view showing principal elements of the infrared optical system in a seventh embodiment of the present invention. In the seventh embodiment, a peripheral edge light shielding member 17 serving as a stop is provided at a peripheral edge of a surface 14a of an aberration correcting plate 14. The peripheral edge light shielding member 17 is, for example, formed by its being coated with a black paint which does not transmit infrared light.

With this geometry, the stop can be omitted as a separate member, and thereby reducing both the number of parts and the manufacturing and assemble steps.

Eighth Embodiment

Figure 11:
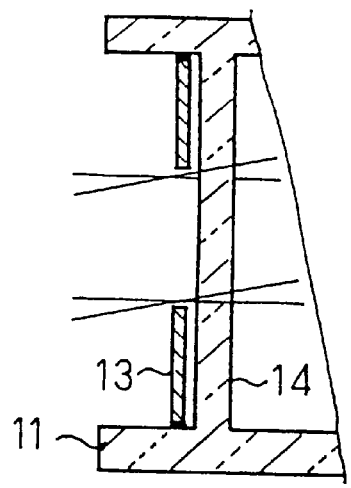
FIG. 11 is a sectional view showing principal elements of the infrared optical system in an eighth embodiment of the present invention.

FIG. 11 is a sectional view showing principal elements of the infrared optical system in an eighth embodiment of the present invention. In the eighth embodiment, both the holding member 11 and the aberration correcting plate 14 are composed of plastic material, and integrally molded. Other configurations are the same as those in the first and second embodiments.

Figure 12:
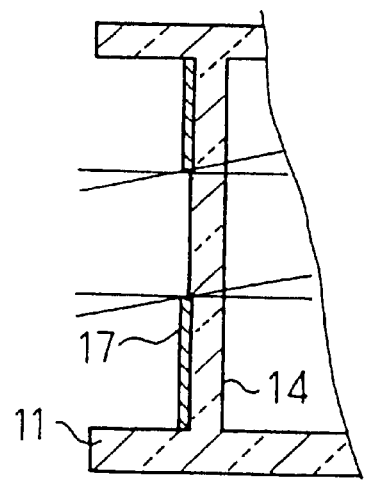
FIG. 12 is a sectional view showing principal elements of the infrared optical system in a ninth embodiment of the present invention.
Figure 13:
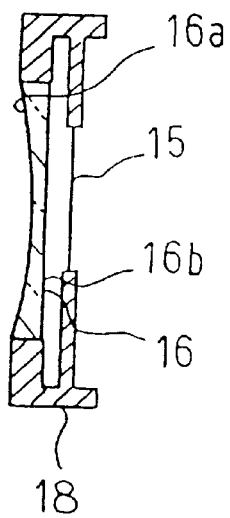
FIG. 13 is a sectional view showing principal elements of the infrared optical system in a tenth embodiment of the present invention.
Figure 14:
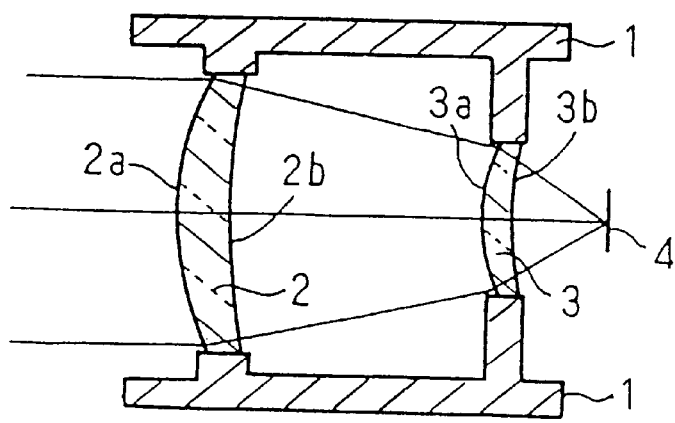
FIG. 14 is a sectional view showing one example of a prior art infrared optical system.

This geometry, in which the holding member 11 and the aberration correcting plate 14 are formed into a unit body, is capable of reducing both the number of parts and the manufacturing and assemble steps. Further, since the integral parts have no tolerance occurred when assembled, the assembly of the entire infrared optical system is facilitated.
Ninth Embodiment It should be noted that although the stop 13 is provided as a separate member from the holding member 11 and the aberration correcting plate 14 as well in the eighth embodiment, as shown in, e.g., FIG. 12, for instance, the holding member 11 and the aberration correcting plate 14 are integrally formed, and the same peripheral edge light shielding member 17 coated with paint as the light shielding member in the seventh embodiment, may be provided on the aberration correcting plate 14.
Tenth Embodiment Although the field flattener 16 is held by the holding member 11 in the second embodiment, as illustrated in, for instance, FIG. 13, a cylindrical holder 18 for example, as a separate member from the holding member 11 may hold the field flattener 16 and the detector 15 of the infrared camera. In this case, dust, etc. is prevented from adhering to the detector 15, thereby protecting it. Moreover, the holder 18 may be constructed as a part of the holding member 11. Namely, the detector 15 may be held by the holding member 11, as in FIG. 2.

Further, in accordance with the embodiments discussed above, the front surface 12a and the rear surface 12b of the convex lens 12 are spherical, or a single surface is spherical while the other surface is planar. However, both or any one of these two surfaces may also be aspherical. The convex lens 12 has a spherical surface, which increases the degree of freedom of the surface, and the aberration can be reduced by making use of this degree of freedom for correcting the aberration. Furthermore, an aberration correction quantity required of the aberration correcting plate can be decreased. Moreover, the work of forming the aspherical surface need not be as fine as the hyperfine work of forming a diffraction surface.

Further, the front surface and rear surface of the convex lens may be a Fresnel lens, and, with this configuration, lens thickness can be decreased even in the case of a lens having the same refracting power, and the length of the optical path of the light traveling inside can be reduced. Accordingly, absorption of infrared light by the convex lens decreases, whereby a brighter image can be obtained. Further, the work of manufacturing the Fresnel lens need not be as fine as the hyperfine work of forming the diffraction surface.

Still further, although one single convex lens 12 is provided in the embodiments discussed above, a plurality of convex lenses may also be provided. This construction has an increased number of lens surfaces, a larger lens thickness and a wider spacing between the lenses, thereby raising the degree of freedom. This increased degree of freedom is used for correcting the aberration, whereby the aberration can be reduced. Further, the aberration correction quantity demanded of the aberration correcting plate can be also decreased.

In the embodiments discussed above, the wavelength of the infrared light is set to 8–12 μm. However, the present invention can be applied to other infrared-light wavelength regions.

What is claimed is:

1. An infrared optical system for infrared cameras, comprising:

holding member;

convex lens held by said holding member and composed of a low-dispersion material transmitting infrared light, said convex lens being a simple lens and having a planar surface and a spherical surface;

a stop, provided on an object-side of said convex lens, for restricting light beams entering said convex lens; and an aberration correcting plate, disposed in the vicinity of said stop and composed of a material transmitting infrared light, for reducing spherical aberration.

2. An infrared optical system for infrared cameras according to claim 1, further comprising:

a field flattener, provided on an image-side on the basis of said convex lens and composed of a material that transmits infrared light, a thickness of which changes along image height so as to offset curvature of field.

3. An infrared optical system for infrared cameras according to claim 2, wherein the thickness of said field flattener changes in a linearly approximate manner.

4. An infrared optical system for infrared cameras according to claim 2, wherein a hole is formed at a central portion of said field flattener.

5. An infrared optical system for infrared cameras according to claim 2, wherein said field flattener is molded integrally with said holding member.

6. An infrared optical system for infrared cameras according to claim 1, wherein said stop is molded integrally with said holding member.

7. An infrared optical system for infrared cameras according to claim 1, wherein said stop is a coated peripheral edge light shielding member provided at a peripheral edge of said aberration correcting plate.

8. An infrared optical system for infrared cameras according to claim 1, wherein said aberration correcting plate is molded integrally with said holding member.

9. An infrared optical system for infrared cameras according to claim 1, wherein said convex lens is an aspherical lens.

10. An infrared optical system for infrared cameras according to claim 1, wherein said convex lens is a Fresnel lens.

11. An infrared optical system for infrared cameras according to claim 2, wherein said field flattener is held by a holder common to a detector of said infrared camera, and disposed so as to protect said detector.

* * * * *